Patented Aug. 14, 1945

2,382,156

UNITED STATES PATENT OFFICE 2,382,156

PREPARATION OF AMINO TRIAZOLES

Donald W. Kaiser, Riverside, Conn., assignor to American Cyanamid Company, New York, N. Y., a corporation of Maine No Drawing. Application May 17, 1944,
Serial No. 536,019

10 Claims. (Cl. 260—308)

This invention relates to a new method of preparing amino triazoles, more particularly to the preparation of 3-amino-1,2,4-triazoles.

I have discovered that when 3-ureido-1,2,4-triazoles are heated in a suitable liquid reaction medium comprising water and an acid or alkali, these compounds are hydrolyzed to form 3-amino-1,2,4-triazoles having the following structural formula:

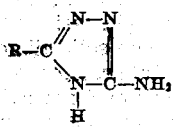

in which R is an alkyl, cycloalkyl, or aryl radical.

Most of the compounds of the present invention are known. The lower members, such as methyl, are very water-soluble, but the higher members are less soluble. They are easily soluble in aqueous solutions of alkalis and acids. The compounds are weak bases and form salts with strong acids. In general, they are soluble in organic solvents, such as Cellosolve (monoethyl-ether of ethylene glycol), aliphatic alcohols, pyridine, etc. The compounds are useful for a variety of purposes: as dyestuff intermediates and in the preparation of pharmaceuticals and resinous products.

The 3-ureido-1,2,4-triazoles used in the process of the present invention can be prepared by reacting an acyl dicyandiamide with an acid salt of hydrazine as shown in Example 2.

A very great number of 3-ureido-1,2,4-triazoles can be employed in the reaction described herein. Among these may be specifically mentioned: 3 - ureido - 5 - methyl-1,2,4-triazole, 3-ureido-5-butyl - 1,2,4-triazole, 3-ureido-5-amyl-1,2,4-triazole, 3 - ureido - 5 - dodecyl - 1,2,4 - triazole, 3-ureido - 5 - octadecyl-1,2,4-triazole, 3-ureido-5-hexyl - 1,2,4 - triazole, 3-ureido-5-(ω-hydroxydecyl) - 1,2,4 - triazole, 3-ureido-5-phenyl-1,2,4-triazole, 3-ureido - 5 - (p-nitrophenyl) -1,2,4-triazole, 3-ureido - 5 - (o-carboxyphenyl) -1,2,4-triazole, 3 - ureido-5-(p-hydroxyphenyl) -1,2,4-triazole, and other alkyl, cycloalkyl, and aryl 3-ureido-1,2,4-triazoles.

In carrying out my invention, hydrolysis may be accomplished by the use of conventional hydrolyzing agents such as strong mineral acids: hydrochloric, nitric, sulfuric, phosphoric, and the like; or alkalis including sodium hydroxide, potassium hydroxide, barium hydroxide, sodium carbonate, potassium carbonate, etc.

The reaction between 3-ureido-1,2,4-triazoles and acid takes place at about 50° to 125° C. or higher and requires from about 1 to about 20 hours for complete hydrolysis depending upon the particular temperature used. The hydrolysis of 3-ureido-1,2,4-triazoles with alkali appears to be more rapid than acid hydrolysis and is usually complete in from about 1 to about 15 hours at temperatures of from about 50° to about 125° C.

A convenient method of conducting the reaction is to mix the reactants in a suitable solvent or diluent and heat the reaction mixture under a reflux condenser until the reaction is complete. The reaction may be conducted under pressure, if desired. A suitable solvent may be water alone or methanol, ethanol, dioxane, Cellosolve, or a mixture of these solvents with each other or with water. Although I usually dissolve the reactants before heating the reaction mixture, it is not necessary that they be completely dissolved. If desired, one of the reactants may be dissolved in a solvent and the other reactant added thereto in undissolved form.

When carrying out the hydrolysis of a 3-ureido-1,2,4-triazole in accordance with my invention, ammonia is evolved. When acid is used as the hydrolyzing agent, the corresponding 3-amino-1,2,4-triazole acid salt is formed. When carrying out the hydrolysis with alkali, an acid salt of the triazole product may be obtained by the addition of acid to the reacted mixture.

My invention will now be illustrated in greater detail by means of the following specific examples, in which representative alkyl and aryl 3-ureido-1,2,4-triazoles are hydrolyzed with acid and alkali to yield 3-amino-5-alkyl (and aryl)-1,2,4-triazines. It will be understood, of course, that these examples are given for purposes of illustration and are not to be considered as limiting my invention to the particular details described therein.

EXAMPLE 1

3-amino-5-phenyl-1,2,4-triazole

A mixture of 20.3 g. (0.10 mol) of 3-ureido-5-phenyl-1,2,4-triazole, 60 g. (0.60 mol) of concentrated hydrochloric acid, 250 cc. of water, and 100 cc. of dioxane was refluxed for 5 hours. Complete solution had occurred by this time, and the solution was clarified with Nuchar and filtered. After cooling, some of the starting material separated and was removed by filtration. Evaporation of the filtrate gave 24.0 g. of tan solid which was not completely dried. Decomposition of this product occurred at 250–252° C., and addition of alkali to an aqueous solution evolved ammonia, due to the presence of ammonium chloride formed during hydrolysis. The bulk of the solid was dissolved in a small volume of hot water, and the solution treated with Nuchar and filtered. The colorless filtrate was diluted with an equal volume of concentrated hydrochloric acid, and within a few minutes the flask became filled with a solid. Filtration gave colorless, fine needles which decomposed at 253–254° C. A portion of the hydrochloride was dissolved in water, made alkaline with sodium hydroxide, and treated with excess nitric acid. Filtration of the insoluble nitrate salt gave an amorphous solid decomposing at 208° C. Another portion of the hydrochloride salt was treated with excess ammonium hydroxide. The free base was found to melt at 187–188° C.

The melting points for 3-amino-5-phenyl-1,2,4-triazole, its nitrate, and its hydrochloride given above correspond to those shown in the literature. As final proof, a mixed melting point was made with a sample of 3-amino-5-phenyl-1,2,4-triazole prepared by another method, and no depression in melting point was observed.

EXAMPLE 2
3-amino-5-phenyl-1,2,4-triazole

To a solution of 16.5 g. of 97% sodium hydroxide in 100 cc. of water was added 42 g. of hydrazine dihydrochloride. This solution was then added to a suspension of 37.6 g. of benzoyl dicyandiamide in 250 cc. of methanol and the whole refluxed. Within 5 minutes of reflux, a solid cake of product had formed. Water was added, the mixture cooled, and the solid filtered, washed well with water and air dried. A quantitative yield of 3-ureido-5-phenyl-1,2,4-triazole was obtained. Other 3-ureido-5-(alkyl, cycloalkyl, and aryl)-1,2,4-triazoles may be prepared in like manner.

A solution of 40.6 g. (0.20 mol) of 3-ureido-5-phenyl-1,2,4-triazole and 33 g. (0.50 mol) of 85% potassium hydroxide in 250 cc. of water was refluxed for 3 hours, during which time ammonia was strongly evolved. Addition of acetic acid to a small portion of the solution gave no precipitate of starting material. The solution was treated with filter aid and Nuchar, filtered, and cooled. Excess nitric acid was slowly added, causing evolution of carbon dioxide and precipitation of the insoluble nitrate. Filtration gave 43 g., or a crude yield of 96%, of a product decomposing at 205° C. Crystallization from hot water gave a 67.5% yield of 3-amino-5-phenyl-1,2,4-triazole nitrate which decomposed at 208–209° C.

EXAMPLE 3
3-amino-5-amyl-1,2,4-triazole

To a solution of 32 g. (0.75 mol) of 95% sodium hydroxide in 250 cc. of water was added 69 g. (0.35 mol) of 3-ureido-5-n-amyl-1,2,4-triazole. The resulting pale yellow solution was refluxed for 7 hours. During this time the solution became colorless, and ammonia was evolved. Norite was added, the solution filtered, and the colorless filtrate cooled and acidified with excess nitric acid. Carbon dioxide was strongly evolved, and colorless crystals of 3-amino-5-n-amyl-1,2,4-triazole nitrate separated. The filtered solid was washed with a little water and acetone and air dried. Decomposition of the product occurred, when a sample was heated, at 138–139° C.

EXAMPLE 4
3-amino-5-methyl-1,2,4-triazole

To a solution of 127.5 g. (3.0 mols) of 95% sodium hydroxide in 300 cc. of water was added 202 g. (1.43 mols) of 3-ureido-5-methyl-1,2,4-triazole. The resulting solution was refluxed for 3 hours, during which time ammonia was strongly evolved. Decolorizing charcoal was added, and the solution filtered, neutralized with acetic acid and evaporated to dryness. The solid was extracted with boiling ethyl acetate and filtered from the sodium acetate. Evaporation of the ethyl acetate solution gave 3-amino-5-methyl-1,2,4-triazole.

EXAMPLE 5
3-amino-5-heptadecyl-1,2,4-triazole

A solution of 25.50 g. (0.60 mol) of 95% sodium hydroxide in 500 cc. of 2-B alcohol was prepared and 107 g. (0.292 mol) of 3-ureido-5-heptadecyl-1,2,4-triazole added and the whole refluxed. The yellow solution soon very slowly evolved ammonia, and solid (sodium carbonate) separated to produce a turbid solution. Heating was continued for a total of 17 hours. The mixture was then poured into 5 liters of cold water and the soapy solution acidified with acetic acid. The nearly colorless precipitate was filtered, washed with water, and dried in an oven at 65° C. The somewhat waxy solid weighed 97 g. and melted at 105–110° C. The solid dissolved in dilute hydrochloric acid to produce a clear, soapy solution. Crystallization from a 50–50 ethanol-Cellosolve mixture gave 83 g. or an 87% purified yield of colorless, amorphous-appearing solid which melted, as before, at 105–110° C.

I claim:

1. A method of preparing 3-amino-1,2,4-triazoles having the formula:

$$R-C\begin{smallmatrix}N-N\\ \\N-C-NH_2\\|\\H\end{smallmatrix}$$

in which R is a member of the group consisting of alkyl, cycloalkyl, and aryl radicals, which comprises heating a compound having the formula:

$$R-C\begin{smallmatrix}N-N\\ \\N-C-N-C-NH_2\\|\ |\ \|\\H\ H\ O\end{smallmatrix}$$

in which R is a member of the group consisting of alkyl, cycloalkyl, and aryl radicals in the presence of water and a hydrolyzing agent.

2. A method of preparing 3-amino-5-aryl-1,2,4-triazoles which comprises heating together water, a strong mineral acid and a 3-ureido-5-aryl-1,2,4-triazole.

3. A method of preparing 3-amino-5-aryl-1,2,4-triazoles which comprises heating together water, an alkali and a 3-ureido-5-aryl-1,2,4-triazole.

4. A method of preparing 3-amino-5-alkyl-1,2,4-triazoles which comprises heating together water, a strong mineral acid and a 3-ureido-5-alkyl-1,2,4-triazole.

5. A method of preparing 3-amino-5-alkyl-1,2,4-triazoles which comprises heating together water, an alkali and a 3-ureido-5-alkyl-1,2,4-triazole.

6. A method of preparing 3-amino-5-aryl-1,2,4-triazoles which comprises mixing together in a water-miscible solvent and heating within the range of 50° to 125° C. water, a strong mineral acid and a 3-ureido-5-aryl-1,2,4-triazole.

7. A method of preparing 3-amino-5-alkyl-1,2,4-triazoles which comprises mixing together in a water-miscible solvent and heating within the range 50° to 125° C. water, an alkali and a 3-ureido-5-alkyl-1,2,4-triazole.

8. A method of preparing 3-amino-5-aryl-1,2,4-triazoles which comprises mixing together an aqueous solution of an alkali with a 3-ureido-5-aryl-1,2,4-triazole and heating the reaction mixture until a 3-amino-5-aryl-1,2,4-triazole has been formed.

9. A method of preparing 3-amino-5-phenyl-1,2,4-triazole which comprises mixing together in an aqueous reaction medium and heating sodium hydroxide and 3-ureido-5-phenyl-1,2,4-triazole.

10. A method of preparing 3-amino-5-alkyl-1,2,4-triazoles which comprises mixing together in an aqueous solvent a strong mineral acid with a 3-ureido-5-alkyl-1,2,4-triazole and heating the reaction mixture until a 3-amino-5-alkyl-1,2,4-triazole has been formed.

DONALD W. KAISER.